United States Patent
Luthra et al.

(10) Patent No.: US 9,414,042 B2
(45) Date of Patent: Aug. 9, 2016

(54) PROGRAM GUIDE GRAPHICS AND VIDEO IN WINDOW FOR 3DTV

(75) Inventors: Ajay K. Luthra, San Diego, CA (US); Arjun Ramamurthy, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 514 days.

(21) Appl. No.: 13/101,824

(22) Filed: May 5, 2011

(65) Prior Publication Data

US 2011/0273534 A1     Nov. 10, 2011

Related U.S. Application Data

(60) Provisional application No. 61/331,580, filed on May 5, 2010.

(51) Int. Cl.
H04N 13/00      (2006.01)
H04N 15/00      (2006.01)
H04N 13/02      (2006.01)

(52) U.S. Cl.
CPC ........... *H04N 13/004* (2013.01); *H04N 13/007* (2013.01); *H04N 13/0029* (2013.01); *H04N 13/026* (2013.01)

(58) Field of Classification Search
USPC ............................................ 348/43, E13.068
See application file for complete search history.

(56) References Cited

U.S. PATENT DOCUMENTS

| | | | | |
|---|---|---|---|---|
| 8,743,178 B2 * | 6/2014 | Filippini | ................ | H04N 11/02 348/42 |
| 9,055,278 B2 * | 6/2015 | Tourapis | ............ | H04N 13/0029 |
| 2003/0090482 A1 * | 5/2003 | Rousso et al. | ................ | 345/419 |
| 2004/0218269 A1 * | 11/2004 | Divelbiss et al. | ............. | 359/464 |
| 2005/0259147 A1 * | 11/2005 | Nam et al. | ....................... | 348/43 |
| 2006/0064716 A1 * | 3/2006 | Sull et al. | ....................... | 725/37 |
| 2008/0085049 A1 * | 4/2008 | Naske et al. | .................. | 382/154 |
| 2008/0122860 A1 * | 5/2008 | Amann | ...................... | G06F 3/14 345/603 |
| 2008/0198920 A1 * | 8/2008 | Yang | .................. | H04N 13/0018 375/240.01 |
| 2009/0150934 A1 * | 6/2009 | Kamen et al. | .................... | 725/40 |
| 2009/0237494 A1 * | 9/2009 | Oota et al. | ...................... | 348/51 |
| 2009/0315979 A1 * | 12/2009 | Jung et al. | ....................... | 348/43 |
| 2010/0021141 A1 * | 1/2010 | Yamashita et al. | ............. | 386/109 |

(Continued)

FOREIGN PATENT DOCUMENTS

WO     WO 2010028107 A1 *    3/2010

OTHER PUBLICATIONS

U.S. Appl. No. 13/011,549, filed Jan. 21, 2011.

*Primary Examiner* — Christopher S Kelley
*Assistant Examiner* — Ana Picon-Feliciano
(74) *Attorney, Agent, or Firm* — Byrne Poh LLP

(57) ABSTRACT

Video data is received in 2D or 3D format from different channels as a user scrolls through an electronic guide. The video data may be displayed in a portion of the on: screen display along with graphic and text associated with the EPG data. The received video data may be converted to a suitable format to be displayed with the Electronic Program Guide (EPG). The video data may be converted from 3D to 2D format to be displayed with the EPG data. The video data may be converted from 2D format to 3D format, while the EPG data displays in 2D format. The video data may be converted from one 3D format to another 3D format for display with the EPG data. Selection of converting the received video data can be based on a display format of a previously viewed channel prior to requesting the EPG to be displayed.

30 Claims, 8 Drawing Sheets

(56) References Cited

U.S. PATENT DOCUMENTS

2010/0083316 A1* 4/2010 Togashi et al. .................. 725/41
2010/0097396 A1* 4/2010 Lee et al. ...................... 345/629
2010/0215343 A1* 8/2010 Ikeda ................... G11B 27/034
  386/241
2010/0306798 A1* 12/2010 Ahn et al. ...................... 725/38
2010/0321390 A1* 12/2010 Kim .................. H04N 13/0029
  345/427
2011/0134216 A1* 6/2011 Neuman ............ H04N 13/0029
  348/43
2012/0019619 A1* 1/2012 Suh .................... H04N 13/0059
  348/43
2012/0182402 A1* 7/2012 Hwangbo .......... G06K 9/00711
  348/51

\* cited by examiner

PROGRAM GUIDE GRAPHICS AND VIDEO IN WINDOW FOR 3DTV

The present application claims the benefit of priority to U.S. Provisional Patent Application Ser. No. 61/331,580, filed on May 5, 2010, entitled "Program Guide Graphics and Video in Window for 3DTV", by Ajay K. Luthra, et al., which is hereby incorporated by reference in its entirety.

FIELD OF THE INVENTION

The invention relates to Electronic Program Guides (EPG), and more particularly to 3D TV format content and EPGs.

BACKGROUND

Depth perception for a 3D TV is provided by capturing two views 1 in two video streams, one for the left eye 2 and other for the right eye 4. Those two views are compressed and sent over various networks or stored on storage media. A decoder decodes those two views and then sends the decoded video for display. Various ways to represent those views can be put in two categories—(i) Half resolution or frame compatible formats where views are merged together in a single video frame, e.g., Top and Bottom panels as shown in FIG. 1 with left view 2 on top of right view 4, Left and Right with left view 2 next to right view 4, or Checker Board pattern (not shown) (see FIGS. 1 and 2 as an example of Top and Bottom, and Side by Side formats) (ii) two views are kept separate and each view has full resolution per eye.

FIG. 3 illustrates an example of a typical Electronic Program Guide (EPG) display for 2D TV. A viewer may use an on screen graphical user interface, most commonly the referred to as program guide or EPG 3 to see the channel/program list available. In a typical EPG display layout, various related information is typically presented in textual or graphical format in portions 9 and 7, and video is presented in a portion 5 corresponding to one or more channels. The graphical images typically include objects, such as "on screen display" (OSD) and "closed caption data (CCD)."

In either of the 3DTV video representation formats above, viewing the program guide runs into the following problems. The graphics and the text data is not displayed in both left and right views such that it appears on both eyes. The EPG also displays video in the small window typically as a picture-in-graphics (PIG) or picture-on-graphics (POG) manner. That window displays video corresponding to the channel selected in the guide, in a smaller size. However, if that video corresponds to a 3DTV channel then the current methods of displaying video in the window does not work, as simply scaling the video and showing it in a smaller size window may create severe distortion.

Further, when a user is surfing through the EPG, he/she is expected to run into the situation where some channels are in 2D TV format and others are in 3D TV format. Even in 3D TV format, there may be different Half Resolution modes (e.g. side by side or top and bottom etc). Going back and forth between 2D and 3D mode to adjust the program guide text and graphics depending upon whether the channel contains 2D video or 3D video will not provide good user experience.

What is needed is a solution for displaying mixed 2D and 3D content while a user is surfing/scrolling through the program guide.

SUMMARY OF THE INVENTION

In accordance with the principles of the invention, an apparatus for providing electronic program guide (EPG) display data may comprise: a receiver which receives video content in a first video format and EPG data; a conversion unit configured to convert the video content from the received first video format to a second video format different from the first video format; a mixer unit configured to provide display data including the EPG data and video content in the second video format, wherein the first video format includes a received 2D video format or a received 3D video format, and the second video format includes a display 2D video format or a display 3D video format.

In the apparatus, each of the received 3D video format and display 3D format may include two views associated with each other in one of: a top and bottom video format, a left and right format, or a checkerboard format. The conversion unit may convert a received 3D format to a display 2D format by selecting only one view for display. The conversion unit converts a received 2D video format to a display 3D video format. The conversion unit may convert a received 3D format to a display 3D format which is a different 3D format than the received 3D format. The conversion may scale the received video from a full screen display size to a picture window display size. The display data may include data indicating that the received video content is in a received 3D video format. The display data is provided in a display 3D format simultaneously with EPG data provided in a 2D format for display. The received video content may be a received channel of video content, and the conversion unit may determine to convert the received video data from a first video format to a second video format based on a video format of a channel received prior to receiving a request to provide EPG data.

In accordance with the principles of the invention a method of providing electronic program guide (EPG) display data may comprise the steps of: receiving video content in a first video format and EPG data; converting the video content from the received first video format to a second video format different from the first video format; mixing the video content in the second video format with the EPG data to provide display data including the EPG data and video content in the second video format, wherein the first video format includes a received 2D video format or a received 3D video format, and the second video format includes a display 2D video format or a display 3D video format. Each of the received 3D video format and display 3D format includes two views associated with each other in one of: a top and bottom video format, a left and right format, or a checkerboard format. The step of converting may include converting a received 3D format to a display 2D format by selecting only one view for display. The step of converting includes converting a received 2D video format to a display 3D video format. The step of converting may include converting a received 3D format to a display 3D format which is a different 3D format than the received 3D format. The step of converting may include scaling the received video from a full screen display size to a picture window display size. The display data may include data indicating that the received video content is in a received 3D video format. The display data may be provided in a display 3D format simultaneously with EPG data provided in a 2D format for display. The received video content may be a received channel of video content, and the step of converting includes determining to convert the received video data from a first video format to a second video format based on a video format of a channel received prior to receiving a request to provide EPG data.

In accordance with the principles of the invention a non-transitory computer readable medium may carry instructions executable by a computer for providing electronic program guide (EPG) display data comprising the steps of: receiving video content in a first video format and EPG data; converting the video content from the received first video format to a second video format different from the first video format; mixing the video content in the second video format with the EPG data to provide display data including the EPG data and video content in the second video format, wherein the first video format includes a received 2D video format or a received 3D video format, and the second video format includes a display 2D video format or a display 3D video format.

The invention allows EPG data to display with video data from a source which provides 2D and 3D video data. During a channel viewing process a user typically scrolls through displayed guide data, which selects video data of a highlighted channel to display in a window. The video data may be converted from a 3D video format to a 2D video format to be displayed with the EPG data. The video data may also be converted from a 2D video format to a 3D video format to be displayed with the EPG data. The conversion of the video data provides a better user experience by displaying a consistent video format during the guide viewing experience. The conversion may also avoid the need to quickly and repeatedly switch from a 2D and 3D display format in an attached television or in a set top box.

DETAILED DESCRIPTION OF THE INVENTION

For simplicity and illustrative purposes, the present disclosure is described by referring mainly to examples thereof. In the following description, numerous specific details are set forth in order to provide a thorough understanding of the present disclosure. It is readily apparent however, that the present disclosure may be practiced without limitation to these specific details. In other instances, some methods and structures have not been described in detail so as not to unnecessarily obscure the present disclosure. Furthermore, different examples are described below. The examples may be used or performed together in different combinations. As used herein, the term "includes" means includes but not limited to the term "including". The term "based on" means based at least in part on.

This invention provides a solution for displaying mixed 2D and 3D content while a user is surfing/scrolling through the program guide. This invention also provides modes to adjust for going back and forth between 2D and 3D content in the EPG display. In addition, it also covers the situation when the 3D is in full resolution per eye (as opposed in Half Resolution mode).

Figure 6:
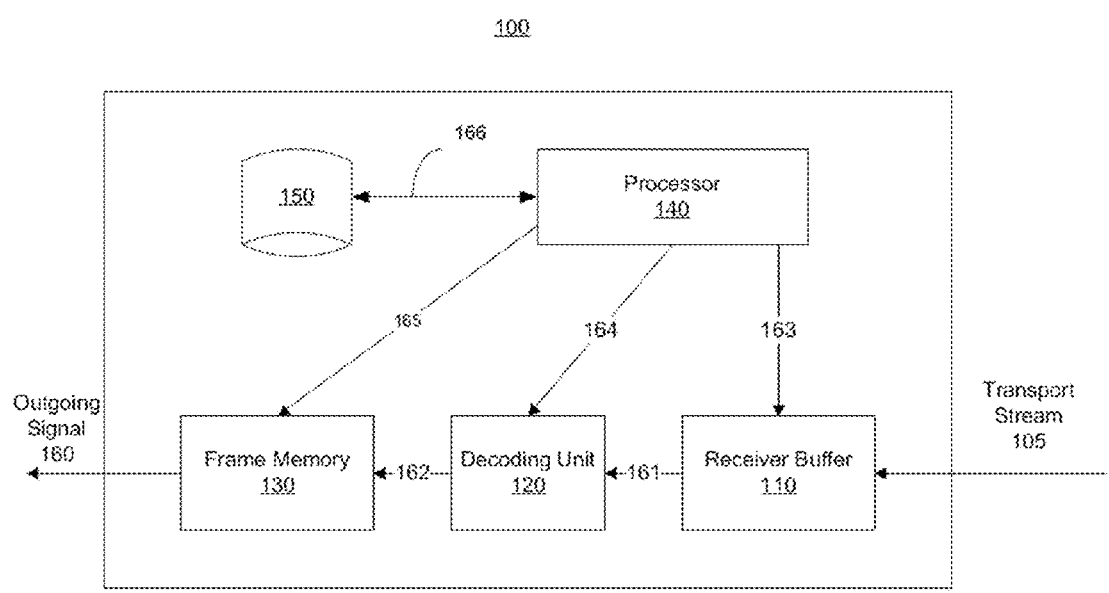
FIG. 6 illustrates illustrating an apparatus, according to an example of the present invention.

FIG. 6 illustrates illustrating an apparatus, according to an example of the present invention. FIG. 6 illustrates a simplified block diagram of an apparatus 100, shown as a decoding apparatus, such as a set top box. The apparatus 100 is operable to implement a 3D overlay architecture, such as a 3D graphics overlay architecture 200 in shown FIG. 7. The apparatus 100 is explained in greater detail below.

FIG. 6 illustrates the apparatus 100, according to an example, in which the apparatus 100 may be an integrated receiving device (IRD) or a set top box (STB). The apparatus 100 includes a receiver buffer 110, a decoding unit 120, a frame memory 130, a processor 140 and a storage device 150. The apparatus 100 receives a transport stream 105 with compressed video data, which includes compressed A/V 161. The transport stream 105 is not limited to any specific video compression standard. The processor 140 of the apparatus 100 controls the amount of data to be transmitted on the basis of the capacity of the receiver buffer 110 and may include other parameters such as the amount of data per a unit of time. The processor 140 controls the decoding unit 120, to prevent the occurrence of a failure of a received signal decoding operation of the apparatus 100. The processor 140 may include, for example, a microcomputer having a separate processor, a random access memory and a read only memory.

The transport stream 105 may be supplied from, for example, a headend facility. The transport stream 104 may include a conventional video signal (e.g. a single view) or a stereoscopic video signal data (stereoscopic views). Both types of video signals may include pictures and/or frames which are decoded at the apparatus 100. The receiver buffer 110 of the apparatus 100 may temporarily store the encoded data received from the headend facility via the transport stream 105.

The decoding unit 120 decodes data amounting to one picture/frame from the receiver buffer 110, and outputs the data. The decoding unit 120 writes a decoded signal 162 into the frame memory 130. The frame memory 130 has a first area into which the decoded signal is written, and a second area used for reading out the decoded data and outputting it to a display, which may be a 3D compatible device e.g. 3DTV or the like.

Figure 7:
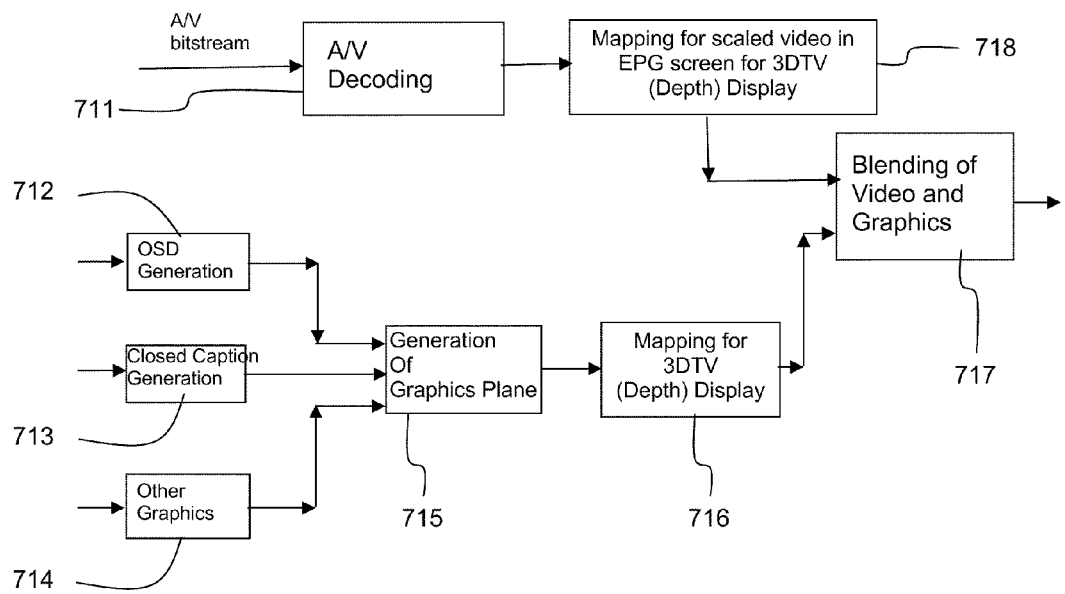
FIG. 7 illustrates an exemplary architecture for overlaying graphics and video in accordance with the invention.

FIG. 7 illustrates an exemplary architecture for overlaying graphics and video in accordance with the invention. In FIG. 7, a video stream, such as compressed audio/video (A/V) stream, is provided to an audio/video decoding module 711. The audio/video decoding module 711 decodes the A/V stream to form a decoded A/V stream which may include a 2D or 3D video stream. The decoded A/V stream may be scaled and mapped in the EPG screen for 3D TV (depth) display in module 718.

The graphics may be provided by an on screen display (OSD) module 712, a closed caption generation module 713, and other graphics generation modules 714, as well known in to those of skill in the art. The graphics portions may be provided to a graphics plane generation module 715 which generates a graphic plane or frame associated with the desired overlay to be produced. While the graphics may be in a 2D format, they may be manipulated to generate a 3D images in the formation of the graphics plane, as discussed in co-pending application U.S. Ser. No. 13/011,549, herein incorporated by reference in its entirety. The graphics image may be provided to a mapping module 716 which maps the graphics image for 3DTV Depth Display. Those of skill in the art will appreciate that the graphics image may be mapped to the expected frames for a 2D or 3D display. The mapped graphics image is provided to a mixing module 717 which blends the graphics image with the scaled video data from mapping module 718 as an overlay. Blending, in terms of video data processing, may include a process which involves compositing different layers of graphics, video data and information into a single frame buffer. The blended information and data may then be provided as a 2D or 3D video signal with a 2D or 3D graphics overlay. The graphics could be left in 2D, but the scaled video received as 3D may be retained in 3D for the guide display (such as with a double frame rate), for a full resolution display of the scaled video in proper 3D.

Figure 1:
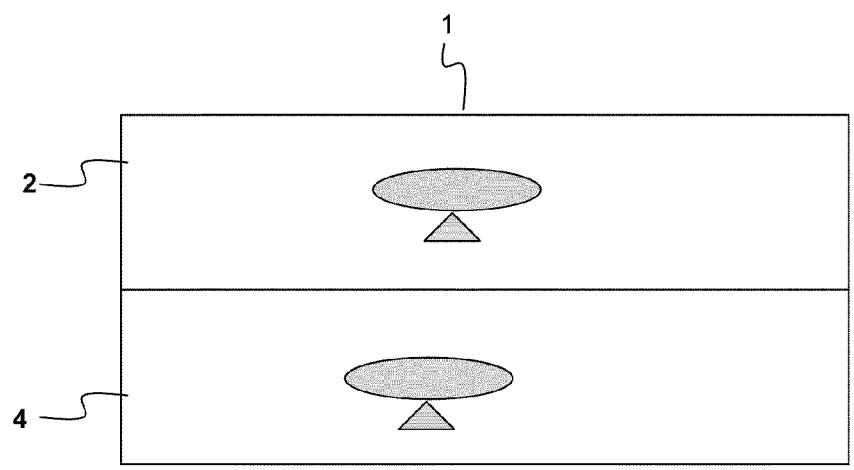
FIGS. 1 and 2 illustrate arrangements of views in 3D TV format.
Figure 2:
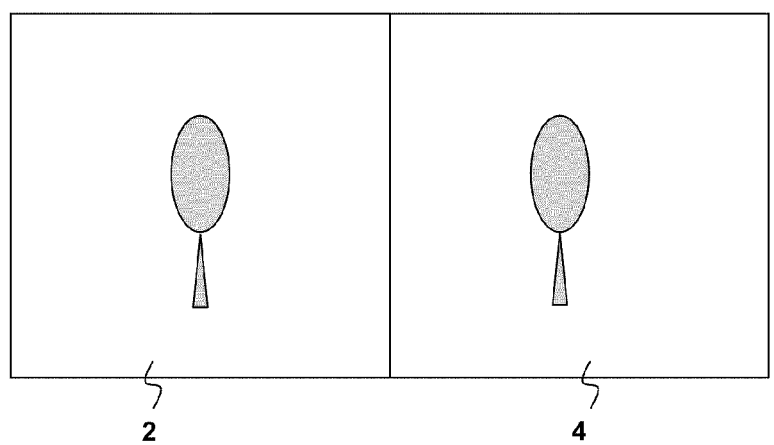
Figure 3:
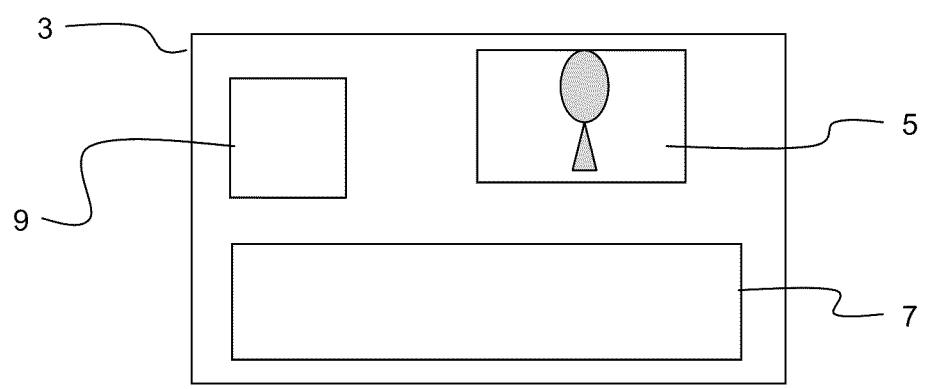
FIG. 3 illustrates an example of a typical Electronic Program Guide (EPG) display for 2D TV.
Figure 4A:
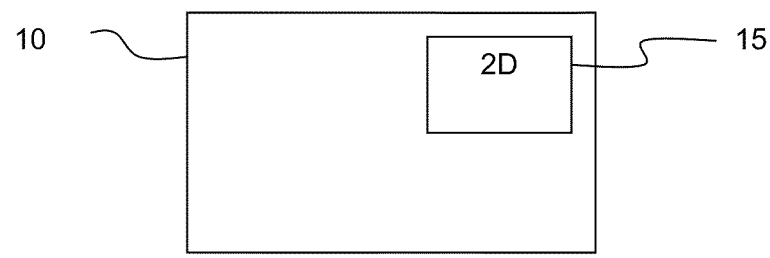
FIGS. 4A-4C illustrate an example of an EPG display layout in accordance with the principles of the invention.
Figure 4B:
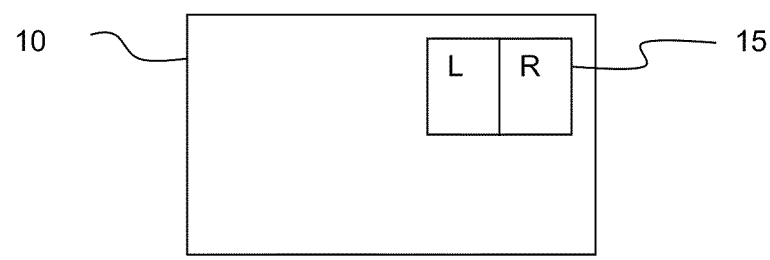
Figure 4C:
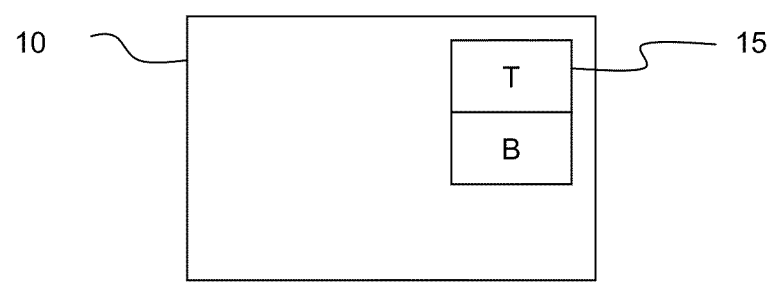

In one implementation a half resolution per eye of 3DTV video may be provided. For example, in the scenario where the STB and TV are in 2D mode, when the user is watching 2D video channel and he/she enters into the EPG screen/menu 10, the scaled 2D video is shown in the window 15 as shown in FIG. 4A. However, when the user scrolls/navigates over to a 3D channel (e.g. one which is Left/Right or Top/Bottom pannelized) in the EPG screen, the scaled video in window will render/display both video panels at the same time in the video stream as shown in FIG. 4B (Left/Right views) or FIG. 4C (Top/Bottom view). Also, the user can be notified by displaying some information in textual or graphical form on the screen that the video in that channel is 3D. In this mode, at all times the graphics and text would be in 2D mode. For the channels with 2D video, there is no change. This mode allows the user to scroll/navigate through 2D/3D channels without the TV and/or STB mode switching, thus providing a smooth transition while navigating/surfing the EPG in 2D.

Figure 5A:
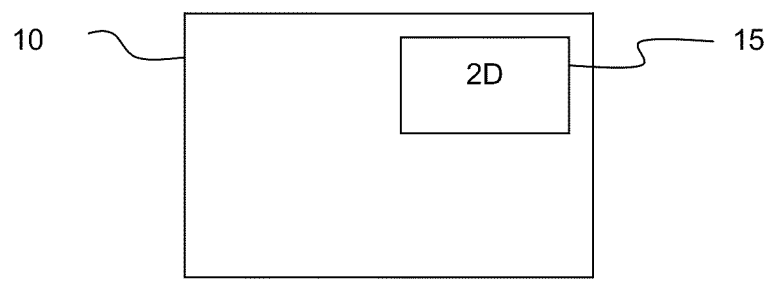
FIGS. 5A-5D illustrate other examples of an EPG display layout in accordance with the principles of the invention.
Figure 5B:
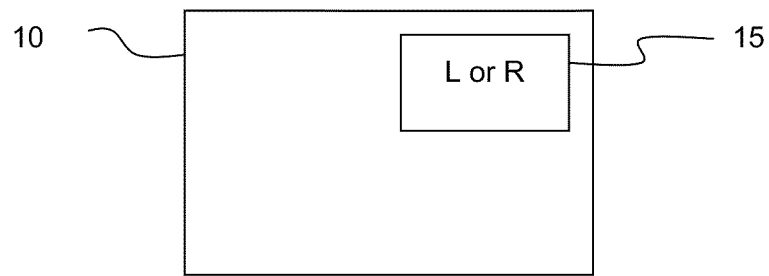

FIG. 5A illustrates a EPG screen 10 with a 2D video stream in video window 15. Alternatively, when the user is navigating through the channel list in the EPG screen and encounters a 3D video channel, we can do a 3D to 2D conversion for the video stream shown in the scaled video window. This conversion to 2D can be done by either by showing only one of the eye views (panels) without interpolation or with interpolating to the size of the window as shown in FIG. 5B. The user can be notified by displaying some information in textual or graphical form on the screen that the video in that channel is in 3D.

Figure 5C:
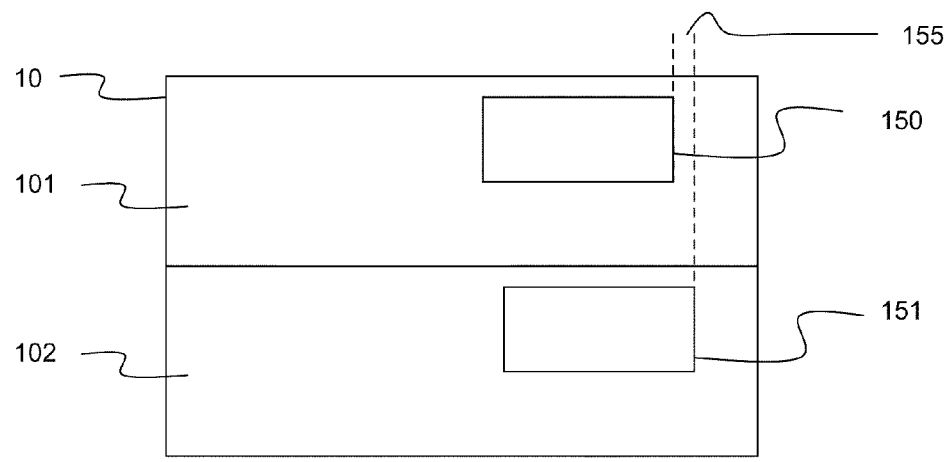
Figure 5D:
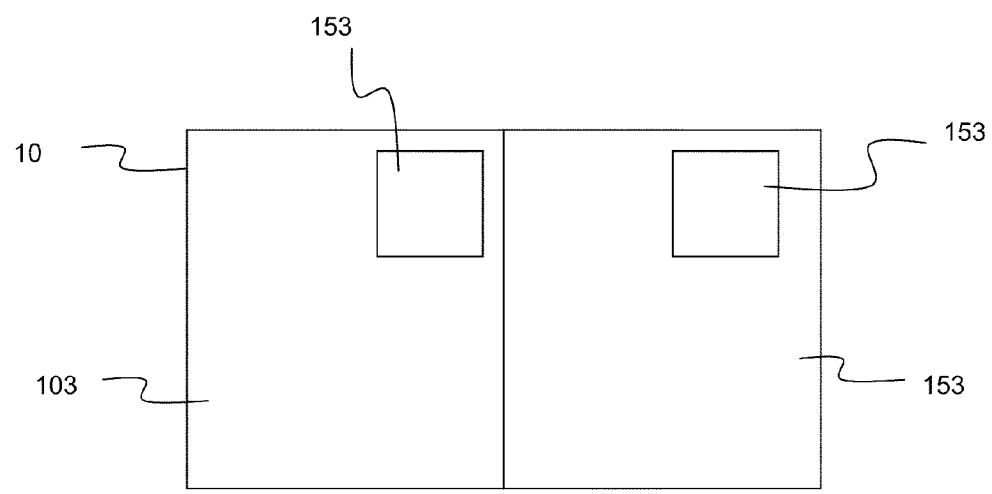

In another scenario, let us consider the situation where STB and/or TV are in 3D mode (a user may already be watching the 3D content before going into the EPG). In this case, one approach may be to change the mode back to 2D and follow one of the methods above. Another approach may be to keep the TV and STB in 3D mode, convert the graphics in 3D and show the video in the window in 3D by copying the graphics information in the both eye views in full resolution. FIG. 5C illustrates this approach with the EPG display 10 a Top display screen 101 and a Bottom 3D display screen 102, carrying top and bottom 3D display video windows 150 and 151, respectively. FIG. 5D illustrate the EPG display 10 with a Left display screen 103 and a Bottom 3D display screen 104, carrying top and bottom 3D display video windows 153 and 154, respectively. A horizontal and/or vertical offset 155 can be also provided while copying the graphics. For example, in conversion of the graphics to 3D, a pixel shift may be added to the two views created to give a depth perception between them. The offset 155 may be adjusted to correspond with the pixel shift. The amount of shift for the pixel shift may a data field provided in the 3D video bit stream, a predetermined amount, or adjustable by the user via a remote control interface. Co-pending U.S. Ser. No. 13/011,549, herein incorporated by reference in its entirety, describes a suitable technique for converting 2D graphics into 3D. If the 3D TV accepts only half resolution video then the full resolution video may be converted into the half resolution 3D format.

However, in the above case, the user may navigate through the channel list that follow a different 3D format (e.g. side-by-side or top-bottom) or from any 3D channel to 2D channel and back. In one approach the 3D video format of the channel that is being viewed just before entering the EPG screen and scale the video window for the EPG screen to that 3D format. For example, assume that the user is watching top-bottom 3D channel and he/she goes into the EPG screen. Now, when the user navigates through the channel list and goes to a side-by-side or 2D channel, the video in the scaled window is always converted to top-bottom panels. The 2D to 3D conversion is done by scaling the 2D video in accordance with the stored 3D video format and copying it over both panels regions or artificially converting 2D video into 3D. Again, the benefit in following this approach is the STB & TV need not switch modes while the users is navigating the channel listing on the EPG, thus providing better user experience.

Alternatively, the tracked 3D video format can be updated to the most current 3D format (whenever changed). For example, if the user is originally in the EPG screen with top-bottom 3D format and he/she navigates through the channel list to a side-by-side video channel, then the scaled video window follows the most current 3D format i.e. side-by-side video format in this example. This would need the STB & TV to switch to the corresponding 3D format. In this case it would be side-by-side format. However, if there is a 2D channel in between a top-bottom 3D channel & side-by-side 3D channel, the scaled video for 2D channel in the EPG screen may be converted to the most recent 3D format. This would obviate the need for the TV to switch modes until a new 3D video format is encountered in the channel list navigation on the EPG screen.

Finally, the scaled video window can always follow the decoded video format. For example, if the user is originally in the EPG screen with top-bottom 3D format and he/she navigates through the channel list to a 2D channel, then the STB & TV may switch to 2D mode. Also, when the user navigates to a side-by-side 3D channel in the EPG screen, the STB & TV may switch to the side-by-side format. This final approach may not only have some limitations of quickly switching modes on both the TV & STB between formats but also may give an unpleasant user experience to change the TV's/STB's mode back and forth between different formats during channel list navigation on the EPG.

Figure 8:
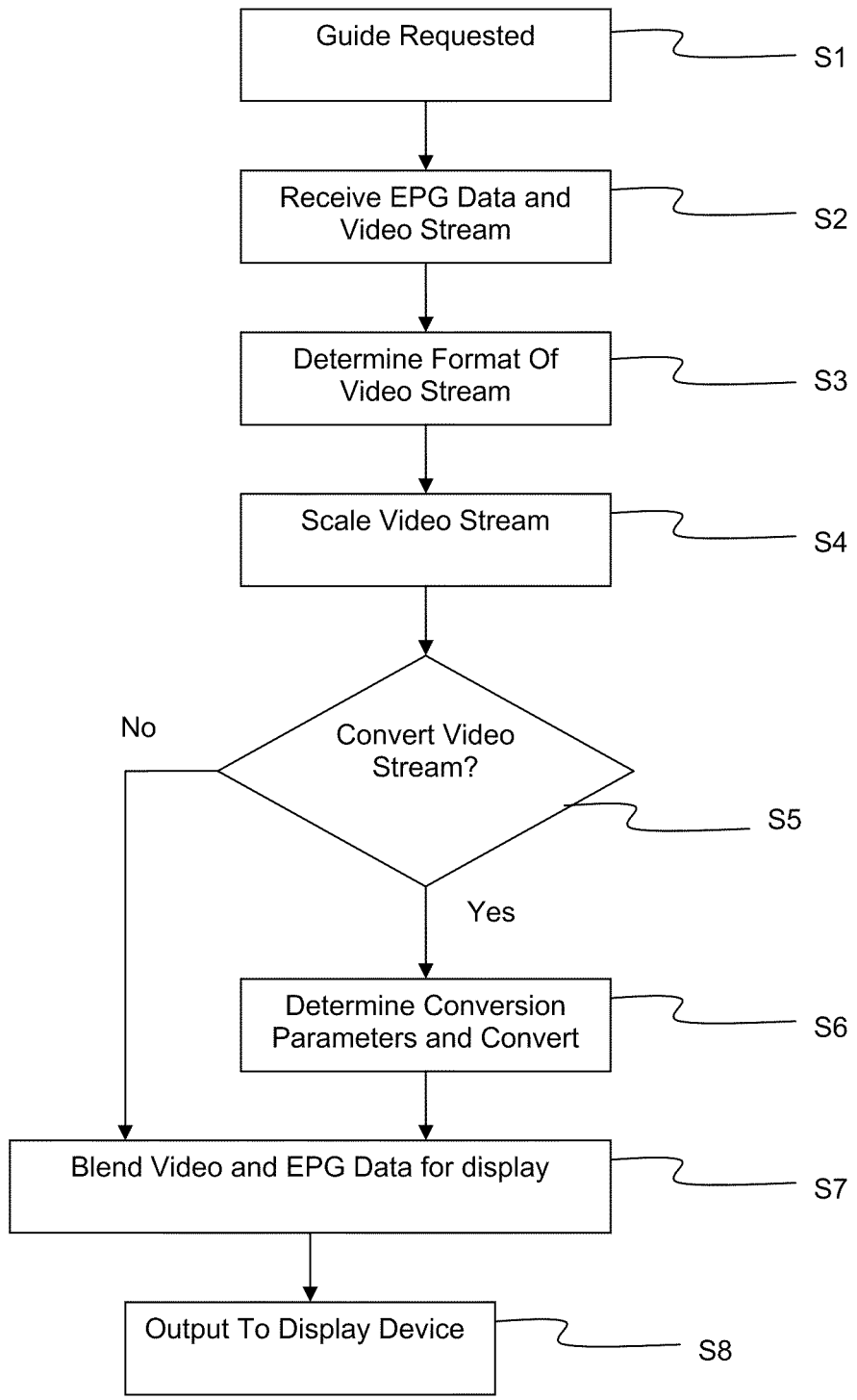
FIG. 8 illustrates a flow diagram of an exemplary process for providing EPG display data in accordance with the invention.

FIG. 8 illustrates a flow diagram of an exemplary process for providing EPG display data in accordance with the invention. While several steps are presented and discussed in order, the presentation and order is simply for discussion purposes. As illustrated in FIG. 8, a request for the guide to be displayed may be received, step S1. In step S2 the EPG data may be retrieved, such as from a memory on apparatus 100, via a download from a network or other source. The video stream associated with the currently tuned and decoded channel is also received in the process, step S2 and the format (e.g. 2D or 3D) of the currently decoded video stream may be determined, step S3. The currently decoded video stream may frequently change while the user is scrolling through the guide, such as when a displayed channel is selected. Although not shown in the process, the format of the currently received channel at the time of the guide request may be determined for later use in the process. The received video stream may be scaled for display as PIP or PIG display as discussed above, step S4.

In step S5, a determination may be made to convert the video stream. The determination to convert the video stream may be based on the techniques discussed above. For example, if the received video stream is in a 2D format and the desired display is a 2D format, then the result of the decision may be No, and the process proceeds to step S7 for blending of the video stream with the EPG data. Alternatively, if the decision is Yes, the conversion parameters may be determined, step S6, such as the conversion mode and the mapping parameters according to the techniques discussed above. In step S7, the video data, such as the converted or unconverted video data, is blended or mixed with the EPG data, as discussed above, and output to a display device, step S8.

Some or all of the operations set forth in the figures may be contained as a utility, program, or subprogram, in any desired computer readable medium. In addition, the operations may be embodied by computer programs, which can exist in a variety of forms both active and inactive. For example, they may exist as MRIS program(s) comprised of program instructions in source code, object code, executable code or other formats. Any of the above may be embodied on a computer readable storage medium, which include storage devices.

An example of a computer readable media includes a conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

The invention allows EPG data to display with video data from a source which provides 2D and 3D video data. During a channel viewing process a user typically scrolls through displayed guide data, which selects video data of a highlighted channel to display in a window. The video data may be converted from a 3D video format to a 2D video format to be displayed with the EPG data. The video data may also be converted from a 2D video format to a 3D video format to be displayed with the EPG data. The conversion of the video data provides a better user experience by displaying a consistent video and guide format during the guide viewing experience. The conversion may also avoid the need to quickly and repeatedly switch from a 2D and 3D display format in an attached television or in a set top box.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described with reference to examples, those skilled in the art are able to make various modifications to the described examples without departing from the scope of the examples as described in the following claims, and their equivalents.

What is claimed is:

1. An apparatus for providing electronic program guide (EPG) display data comprising:
    at least one hardware processor that is configured to:
        identify a first video format associated with first video content associated with a first channel in response to receiving a request to display EPG data associated with the first channel;
        generate first scaled video content by scaling the first video content associated with the first channel;
        cause the first scaled video content and the EPG data associated with the first channel to be displayed in an EPG screen;
        receive a user selection of a second channel using the EPG screen;
        in response to receiving the user selection, identify a second video format associated with second video content associated with the second channel;
        generate second scaled video content by scaling the second video content associated with the second channel;
        determine whether the second video format associated with the second video content is different from the first video format associated with the first video content based at least in part on whether the first video format corresponds to 2D video content or 3D video content and whether the second video format corresponds to 2D video content or 3D video content;
        in response to determining that the second video format is different from the first video format, convert the second scaled video content to the first video format; and
        cause the converted video content and EPG data associated with the second channel to be displayed in the EPG screen.

2. The apparatus of claim 1, wherein each of the first video format and the second video format is a 3D format that includes two views associated with each other in one of: a top and bottom video format, a left and right format, or a checkerboard format.

3. The apparatus of claim 2, wherein converting the second scaled video content includes converting a received 3D format to a display 2D format by selecting only one view for display.

4. The apparatus of claim 2, wherein converting the second scaled video content includes converting a received 3D format to a display 3D format which is a different 3D format than the received 3D format.

5. The apparatus of claim 2, wherein converting the second scaled video content includes converting a received 2D video format to a display 3D video format.

6. The apparatus of claim 5, wherein the conversion provides an offset to the display 3D video format.

7. The apparatus of claim 1, wherein scaling includes scaling the received video content from a full screen display size to a picture window display size.

8. The apparatus of claim 1, wherein display data includes data indicating that received video content is in a received 3D video format.

9. The apparatus of claim 1, wherein display data is provided in a display 3D format simultaneously with EPG data provided in a 2D format for display.

10. The apparatus of claim 1, wherein the hardware processor is further configured to receive video content that is a received channel of video content and determine to convert the received video data from the first video format to the second video format based on a video format of a channel received prior to receiving a request to provide the EPG data.

11. A method of providing electronic program guide (EPG) display data comprising the steps of:
    identifying a first video format associated with first video content associated with a first channel in response to receiving a request to display EPG data associated with the first channel;
    generating first scaled video content by scaling the first video content associated with the first channel;
    causing the first scaled video content and the EPG data associated with the first channel to be displayed in an EPG screen;

receiving a user selection of a second channel using the EPG screen;

in response to receiving the user selection, identifying a second video format associated with second video content associated with the second channel;

generate second scaled video content by scaling the second video content associated with the second channel;

determining whether the second video format associated with the second video content is different from the first video format associated with the first video content based at least in part on whether the first video format corresponds to 2D video content or 3D video content and whether the second video format corresponds to 2D video content or 3D video content;

in response to determining that the second video format is different from the first video format, convert the second scaled video content to the first video format; and causing the converted video content and EPG data associated with the second channel to be displayed in the EPG screen.

12. The method of claim 11, wherein each of the first video format and the second video format is a 3D format that includes two views associated with each other in one of: a top and bottom video format, a left and right format, or a checkerboard format.

13. The method of claim 12, wherein the step of converting includes converting a received 3D format to a display 2D format by selecting only one view for display.

14. The method of claim 12, wherein the step of converting includes converting a received 3D format to a display 3D format which is a different 3D format than the received 3D format.

15. The method of claim 12, wherein the step of converting includes converting a received 2D video format to a display 3D video format.

16. The method of claim 15, wherein the step of converting includes providing an offset to the display 3D video format.

17. The method of claim 11, wherein the step of scaling includes scaling the received video content from a full screen display size to a picture window display size.

18. The method of claim 11, wherein display data includes data indicating that received video content is in a received 3D video format.

19. The method of claim 11, wherein display data is provided in a display 3D format simultaneously with EPG data provided in a 2D format for display.

20. The method of claim 11, further comprising:
receiving video content that is a received channel of video content; and
determining to convert the received video data from the first video format to the second video format based on a video format of a channel received prior to receiving a request to provide the EPG data.

21. A non-transitory computer readable medium carrying instructions executable by a computer for providing electronic program guide (EPG) display data comprising the steps of:
identifying a first video format associated with first video content associated with a first channel in response to receiving a request to display EPG data associated with the first channel;
generating first scaled video content by scaling the first video content associated with the first channel;

causing the first scaled video content and the EPG data associated with the first channel to be displayed in an EPG screen;

receiving a user selection of a second channel using the EPG screen;

in response to receiving the user selection, identifying a second video format associated with second video content associated with the second channel;

generate second scaled video content by scaling the second video content associated with the second channel;

determining whether the second video format associated with the second video content is different from the first video format associated with the first video content based at least in part on whether the first video format corresponds to 2D video content or 3D video content and whether the second video format corresponds to 2D video content or 3D video content;

in response to determining that the second video format is different from the first video format, convert the second scaled video content to the first video format; and causing the converted video content and EPG data associated with the second channel to be displayed in the EPG screen.

22. The computer readable medium of claim 21, wherein each of the first video format and the second video format is a 3D format that includes two views associated with each other in one of: a top and bottom video format, a left and right format, or a checkerboard format.

23. The computer readable medium of claim 22, wherein the step of converting includes converting a received 3D format to a display 2D format by selecting only one view for display.

24. The computer readable medium of claim 22, wherein the step of converting includes converting a received 3D format to a display 3D format which is a different 3D format than the received 3D format.

25. The computer readable medium of claim 22, wherein the step of converting includes converting a received 2D video format to a display 3D video format.

26. The computer readable medium of claim 25, wherein the step of converting includes providing an offset to the display 3D video format.

27. The computer readable medium of claim 21, wherein the step of scaling includes scaling the received video content from a full screen display size to a picture window display size.

28. The computer readable medium of claim 21, wherein display data includes data indicating that received video content is in a received 3D video format.

29. The computer readable medium of claim 21, wherein display data is provided in a display 3D format simultaneously with EPG data provided in a 2D format for display.

30. The computer readable medium of claim 21, wherein the method further comprises:
receiving video content that is a received channel of video content; and
determining to convert the received video data from the first video format to the second video format based on a video format of a channel received prior to receiving a request to provide the EPG data.

* * * * *